US008502828B2

(12) United States Patent
Lonkar (10) Patent No.: US 8,502,828 B2
(45) Date of Patent: Aug. 6, 2013

(54) UTILIZATION OF A GRAPHICS PROCESSING UNIT BASED ON PRODUCTION PIPELINE TASKS

(75) Inventor: Amruta S Lonkar, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 671 days.

(21) Appl. No.: 12/758,062

(22) Filed: Apr. 12, 2010

(65) Prior Publication Data

US 2011/0249010 A1    Oct. 13, 2011

(51) Int. Cl.
*G06F 15/16*    (2006.01)
*G06F 15/80*    (2006.01)

(52) U.S. Cl.
USPC ............ 345/502; 345/503; 345/504; 345/505

(58) Field of Classification Search
None
See application file for complete search history.

(56) References Cited

U.S. PATENT DOCUMENTS

| 7,659,897 B1* | 2/2010 | Azar .............................. 345/501 |
| 7,730,408 B2* | 6/2010 | Clark et al. ................... 715/736 |
| 8,234,392 B2* | 7/2012 | Graffagnino et al. ......... 709/230 |
| 2003/0101391 A1* | 5/2003 | Man et al. ...................... 714/718 |
| 2009/0109230 A1* | 4/2009 | Miller et al. .................. 345/506 |
| 2010/0138475 A1* | 6/2010 | Frank et al. ................... 709/203 |

* cited by examiner

*Primary Examiner* — Ke Xiao
*Assistant Examiner* — Donna Ricks
(74) *Attorney, Agent, or Firm* — Raj Abhyanker, P.C.

(57) ABSTRACT

A method includes performing a task in response to a request of a secondary user interface of a secondary device. The method also includes calculating a utilization of a graphics processing unit of a machine based on the task performed by the graphics processing unit. The method further includes determining the utilization, through a processor, based on a comparison of a consumption of a computing resource of the graphics processing unit and a sum of the computing resource available. The method furthermore includes performing another task in response to the request of another secondary user interface of another secondary device. The method furthermore includes calculating another utilization of another graphics processing unit based on the another task performed by the another graphics processing unit. The method furthermore includes determining the another utilization based on the comparison of a consumption of the computing resource of the another graphics processing unit.

10 Claims, 8 Drawing Sheets

UTILIZATION OF A GRAPHICS PROCESSING UNIT BASED ON PRODUCTION PIPELINE TASKS

FIELD OF TECHNOLOGY

This disclosure relates generally to visual processing and, more particularly, to a method, apparatus, and system of a utilization of a graphics processing unit (GPU) based on production pipeline tasks.

BACKGROUND

Visual effects studios and film studios may organize a particular project based on a workflow. The workflow may include pre-production, production, and post-production phases. The pre-production phase may relate to concept development and story development. The production phase may relate to creation and development of the film and/or visual project. The post-production phase may relate to final editing of the project. The production phase (pipeline) may be divided into discrete tasks. The discrete tasks may include modeling, background and color, special effects, animation, lighting and texturing, and/or rendering. Each task in the production pipeline may be assigned to a specialist, for example, an animator would be assigned the task of animation. The workstation requirements for each task may vary based on the specific task, for example, animation may not require high computing capabilities, but rendering may require high computing capabilities.

Each workstation may be setup and tailored for the specific task. The technical lead may manually setup each workstation based on a benchmarking of the graphics processing unit. The manual setup may be time consuming, because the technical lead may have to calculate and/or estimate the usage of a graphics processing unit for each specific task. Additionally, once a workstation is setup for the specific task, there may be difficulty in using the workstation for another task. For example, an animation workstation may have difficulty performing a rendering task, because the animation workstation may not have enough computing capabilities. Conversely, a rendering workstation may be underutilized if it were used to perform an animation task, because animation may not require much computing capabilities.

Rendering may utilize a significant amount of computing capabilities. Rendering may be the process of generating an image from a model through computer programs. The rendering process may be time consuming, because rendering may be a complex process that may require significant computing resources. The computing resources dedicated to the rendering process may be limited to workstations setup for rendering, which may limit access to available computing resources.

SUMMARY

Disclosed are a method and/or a system of a utilization of a graphics processing unit (GPU) based on production pipeline tasks.

In one aspect, a method includes performing a task in response to a request of a secondary user interface of a secondary device. The method also includes calculating a utilization of a graphics processing unit of a machine based on the task performed by the graphics processing unit. The method further includes determining the utilization, through a processor, based on a comparison of a consumption of a computing resource of the graphics processing unit and a sum of the computing resource available. The method furthermore includes performing another task in response to the request of another secondary user interface of another secondary device. The method furthermore includes calculating another utilization of another graphics processing unit based on another task performed by another graphics processing unit.

The method furthermore includes determining another utilization based on the comparison of a consumption of the computing resource of another graphics processing unit and the sum of the computing resource available. The method furthermore includes displaying the utilization and another utilization on a primary user interface of a primary device. A user of the primary device may be different than the user of the secondary device. The method furthermore includes automatically implementing a setup of the machine based on the utilization of the graphics processing unit performing the task and based on another utilization of another graphics processing unit performing another task.

In another aspect, a method includes determining utilization, through a processor, of a graphics processing unit of a secondary device to perform a task. The utilization of the graphics processing unit may be a percentage based on a computing power dedicated to perform the task and the computing power of the graphics processing unit. The task may be animation. The method also includes determining another utilization of another graphics processing unit of another secondary device to perform the task. The utilization of the graphics processing unit may be the percentage based on the computing power dedicated to perform the task and the computing power of another graphics processing unit.

The method further includes displaying the utilization and another utilization on a primary device. The primary device may be different than the secondary device and another secondary device. The method furthermore includes selecting one of the secondary device and another secondary device to continue to perform the task based on the utilization of the graphics processing unit and another utilization of another graphics processing unit. The method furthermore includes implementing a setup of one of the secondary device and another secondary device based on the selection.

In yet another aspect, a system includes a processor to determine a utilization of a graphics processing unit of a secondary device to perform a task. The utilization of the graphics processing unit may be a percentage based on a computing power dedicated to perform the task and the computing power of the graphics processing unit. The system also includes the graphics processing unit to perform the task in response to a request of the secondary device. The system further includes the secondary device to request a performance of the task in response to a secondary user interface. The system furthermore includes a primary device to display the utilization of the graphics processing unit based on the performance of the graphics processing unit to execute the task.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of utilization of graphics processing unit (GPU) based on production pipeline tasks. Although the present embodiments have been described with reference to specific example embodiments, it will be evident that various modifications and changes may be made to these embodiments without departing from the broader spirit and scope of the various embodiments.

Figure 1:
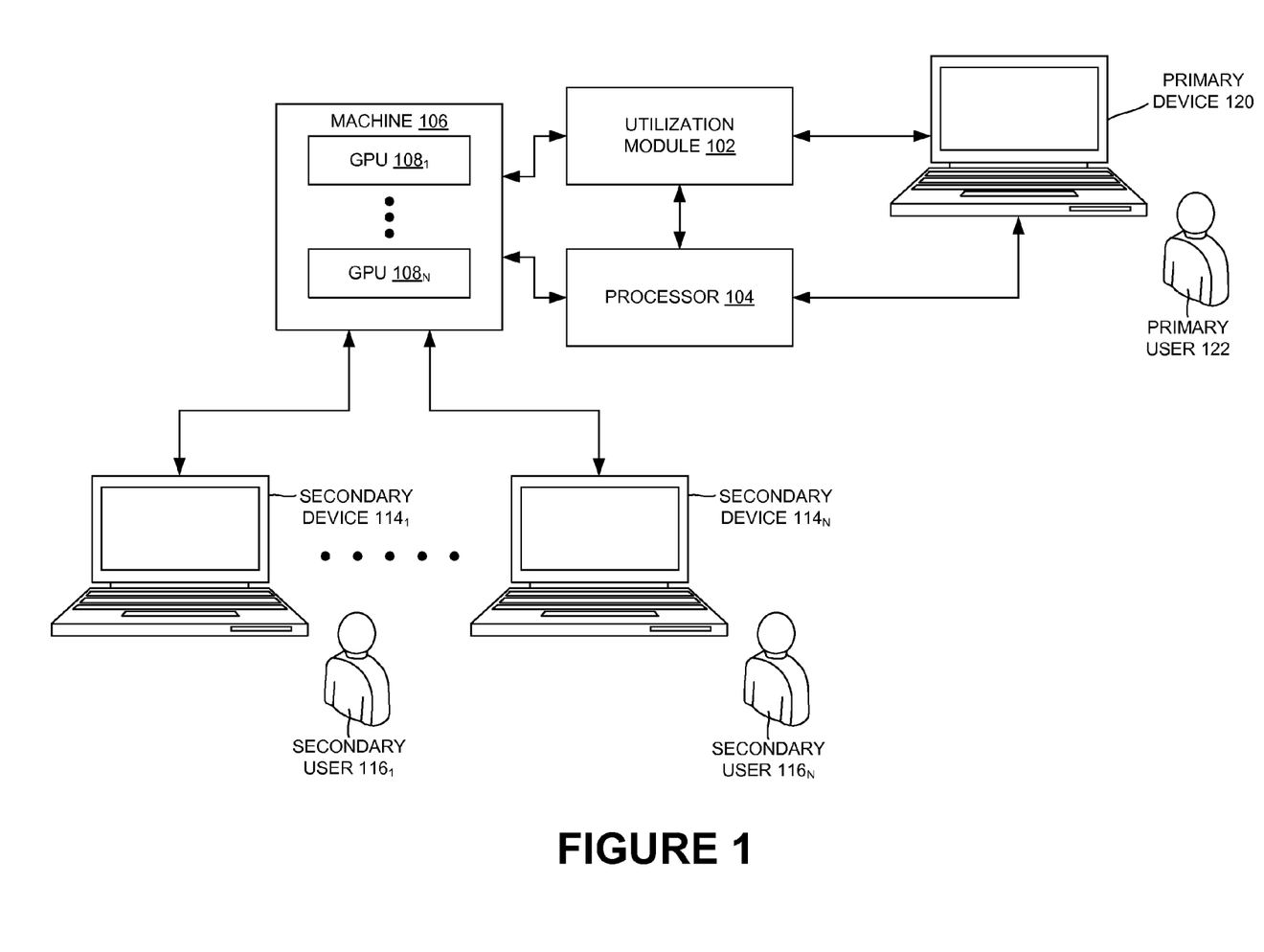
FIG. 1 is a schematic view of a system of utilization of graphics processing unit (GPU) based on production pipeline tasks, according to one or more embodiments.

FIG. 1 is a schematic view of a system of utilization of graphics processing unit (GPU) based on production pipeline tasks, according to one or more embodiments. The production pipeline tasks may include one or more tasks executed in pipeline in a workflow of a project in for example, a visual effect studio. In one or more embodiments, the system includes a machine 106 (e.g., a local server) coupled to one or more secondary devices (e.g., secondary device 114$_1$, secondary device 114$_N$) and housing one or more processors including but not limited to one or more central processing units (CPUs) and/or one or more GPUs (e.g., GPU 108, GPU 108$_N$), the processors operatively coupled to the secondary devices to enable processing of one or more tasks performed within the secondary devices. Herein, multiple instances of like objects are denoted with reference numbers, identifying the object and parenthetical numbers and/or subscripts identifying the instance where needed. The secondary devices may include, for example, computers, laptops, and the like. The secondary devices (e.g., a work station) may be used in the visual effect studio for performing one or more tasks involved in a workflow of a project in the visual effect studio.

Figure 2:
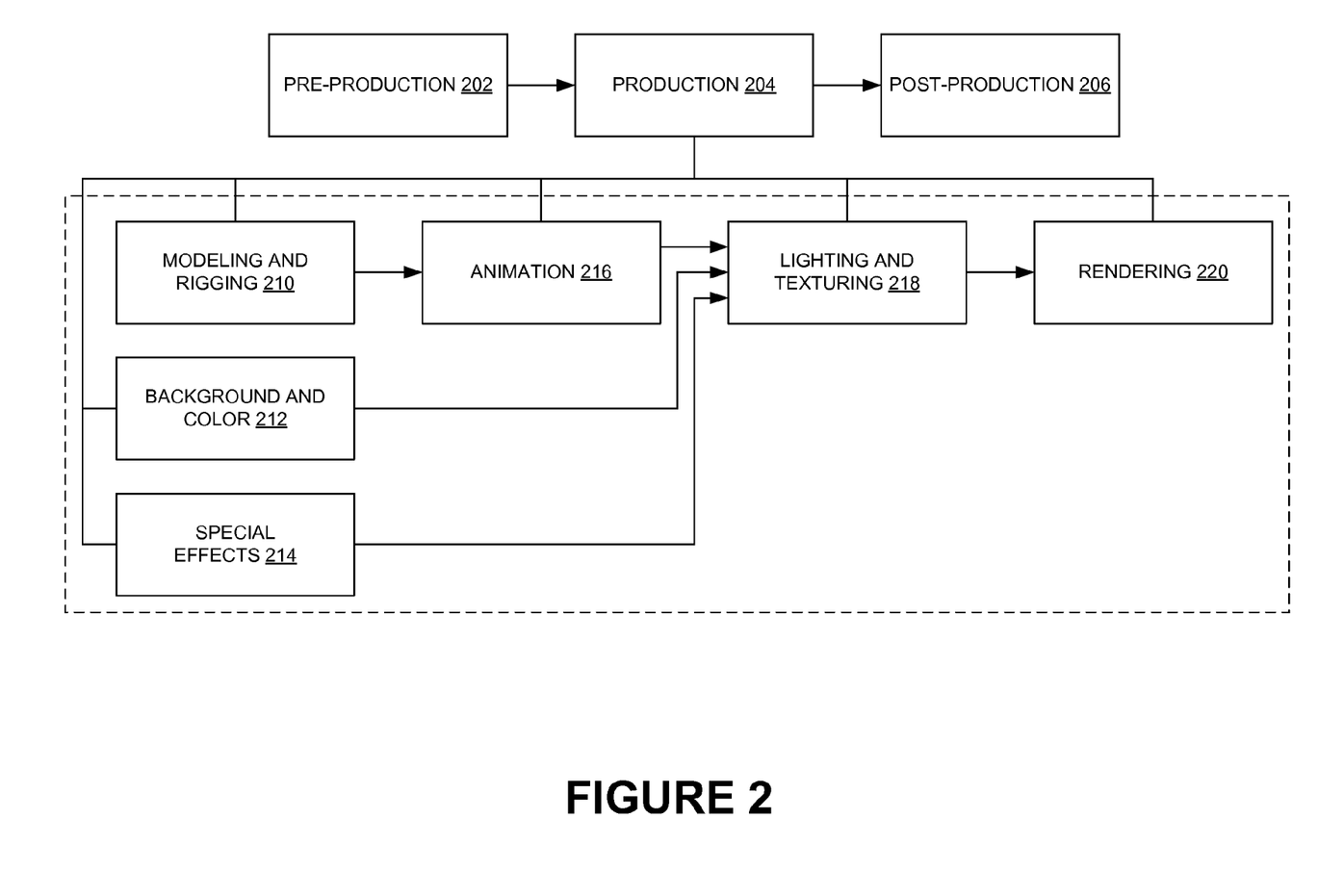
FIG. 2 illustrates various stages involved in a workflow of a project in a visual studio, according to one or more embodiments.

The tasks involved in the workflow may include, for example, modeling and rigging, animation, lighting and texturing, rendering, background and color, special effects, and the like. FIG. 2 illustrates various stages involved in the workflow of a project in the visual effect studio. The workflow may involve pre-production 202, production 204, and post production 206 stages as illustrated in FIG. 2. The production 204 stage may include one or more set of tasks to be performed in a pipeline, one after the other. The tasks in a pipeline may include modeling and rigging 210, animation 216, lighting and texturing 218, and rendering 220 in a first pipeline, background and color 212, lighting and texturing 218, and rendering 220 in a second pipeline, or special effects 214, lighting and texturing 218, and rendering 220 in a third pipeline as illustrated in FIG. 2. In one or more embodiments, GPU usage for each of the tasks in the pipeline may be identified to determine utilization of the GPU. The secondary devices may be accessed by one or more secondary users, for example, secondary user 116$_1$ (e.g., modeler), secondary user 116$_N$ (e.g., animator).

The GPU usage and system requirements for each of the secondary users (e.g., the modeler or the animator) may be different based on the tasks performed using the secondary devices. For example, the secondary user 116$_1$ (e.g., modeler) may use the GPU 108 as a display card during a modeling stage of production and may not utilize high computing capabilities of the GPU 108. On the other hand, the secondary user 116$_N$ using the secondary device 114$_N$ for rendering may utilize the computing capabilities of the GPU 108$_N$. Accordingly, utilization of the GPU may vary based on the tasks. The utilization of the GPU may be a percentage based on a computing power dedicated to perform the task and the computing power of the GPU. In one or more embodiments, the system may include a primary user interface (not shown) (e.g., a graphical user interface, a touch interface, and the like) to render a data associated with utilization of the GPU to a primary user 122 (e.g., a technical lead) using a primary device 120.

The primary device 120 may include a utilization module 102 to locally and/or remotely monitor the utilization of the GPU across the secondary devices and/or across multiple tasks through the GPU used by the secondary devices based on one or more inputs received through the primary user interface. The primary user interface may be operatively coupled to the primary device 120 or the machine 106. In one or more embodiments, the system may also include a processor 104 (e.g., CPU, GPU) to determine the utilization of a GPU by the secondary devices in run time. The utilization of the GPU may be determined based on a comparison of a consumption of a computing resource of the GPU and a sum of the computing resource available. In one or more embodiments, the utilization module 102 may control and coordinate various functions of the processor 104 and/or the primary user interface. In one or more embodiments, the determined utilization of the GPU may be rendered to the primary user 122 through the primary user interface.

The primary user 122 may view and analyze the utilization of the GPU rendered through the primary user interface and may optimize the utilization of the GPU. In one or more embodiments, the machine 106 may be configured to optimize the utilization of the GPU based on monitoring the utilization of the GPU in real time. During optimization, the utilization module 102 may enable the primary user 122 to apply one or more task based profiles to enhance a GPU performance. In one or more embodiments, the task based profiles may be applied remotely. In one or more embodiments, the machine 106 may automatically apply task based profiles based on the utilization of the GPU determined through the processor. The task based profiles may include configuring one or more system setups of the secondary devices to operate or to perform any given task, for example, resolution setting for the GPU, settings to cause the GPU to be used solely as a display card, and the like, depending on the tasks. In one or more embodiments, each task may have a unique task based profile assigned therein. The task based profiles may be applied in real time and/or during run time. Application of task based profiles in real time may enable the secondary device to switch between different tasks in real time.

In one or more embodiments, the primary user interface may also enable the primary user 122 and/or the machine 106 to generate and/or set a benchmark for the GPU by running one or more predefined stress tests. Running the predefined stress tests may involve running a set of executable computer program code through the GPU. A performance of the GPU may be assessed based on a result of running the executable computer program code. The performance may be assessed by monitoring the utilization of the GPU through the primary user interface. Based on the assessment, the performance of the GPU to run a software and/or a hardware application may be tested to benchmark the GPU based on the performance. The GPU may be benchmarked based on the testing. The benchmark may be displayed through the primary user interface. A setup may be implemented in one or more of the secondary devices based on the benchmark. The setup may include a configuration of the secondary devices to operate or to perform any given task.

In one or more embodiments, the primary user 122 may be able to assign the GPUs to different secondary devices, based on the monitoring of the utilization of the GPU. The primary user 122 may assign the GPU to various secondary devices at different instants of time based on the requirements of the applied task based profiles in order to optimize the utilization of the GPU. For example, if a secondary system used for animation needs to be used for background and color, the functionality of the GPU required may be changed from a mere display card to a display card with high computing capabilities to render the background and color in a required form. In one or more embodiments, the primary user interface may enable generation of graphs of the utilization of the GPU over a period of time. In one or more embodiments, the primary user interface may enable viewing utilization of the GPU by multiple secondary devices in real time.

In one or more embodiments, the utilization and/or performance of the GPU may be optimized for each individual task. In one or more embodiments, monitoring the utilization of the GPU may enable reutilization of a GPU horsepower over a network of secondary devices. The network may include, for example, a local area network. The reutilization may be through resource allocation. For example, if a GPU associated with a particular secondary device is idle, the GPU may be assigned to another secondary device in the local area network of the secondary device. In one or more embodiments, a compute unified device architecture (CUDA) application may be run over the network to reutilize the GPUs. Those skilled in the art with access to the present teachings will recognize that CUDA may be a C language interface that provides parallelization and a functionality of the CUDA allows a developer to write C language functions to be executed on the GPU. CUDA may also include memory management and execution configuration. CUDA may enable controlling multiple GPUs.

In one or more embodiments, the CUDA application may communicate with one or more CPU schedulers to enable resource (e.g., GPU) allocation and/or sharing. For example, if the primary user 122 identifies an idle state of a GPU assigned to the secondary device $114_1$ of the secondary user $116_1$ (e.g., modeler) for performing the task of modeling and rigging, then the CUDA application may enable the primary user 122 to assign the GPU to a secondary device $114_N$ of a secondary user $116_N$ (e.g., animator) to perform animation while using the GPU as a display card. In another example scenario, if for example, the primary user 122 identifies that the utilization of a GPU assigned to the secondary device $114_1$ is low, then the CUDA application may enable the primary user 122 to assign the GPU to the secondary device $114_N$ to perform a task of special effects requiring high computing capabilities of the GPU.

In one or more embodiments, the machine 106 may be enabled to automatically perform allocation of computing resources in a local area network of the secondary devices and the machine 106, based on the utilization of the GPUs by the secondary devices in real time and/or during run time. In one or more embodiments, the allocation may be enabled through an allocation module 502 (not shown). The allocation module may be an application installed in either the primary device 120 or the machine 106. The allocation module may enable allocation through the processor 104. In one or more embodiments, the GPU may be slaved to any other GPU on the machine 106 by adjusting configuration settings of the GPU, while implementing the allocation based on monitoring of the utilization of the GPU.

Figure 3:
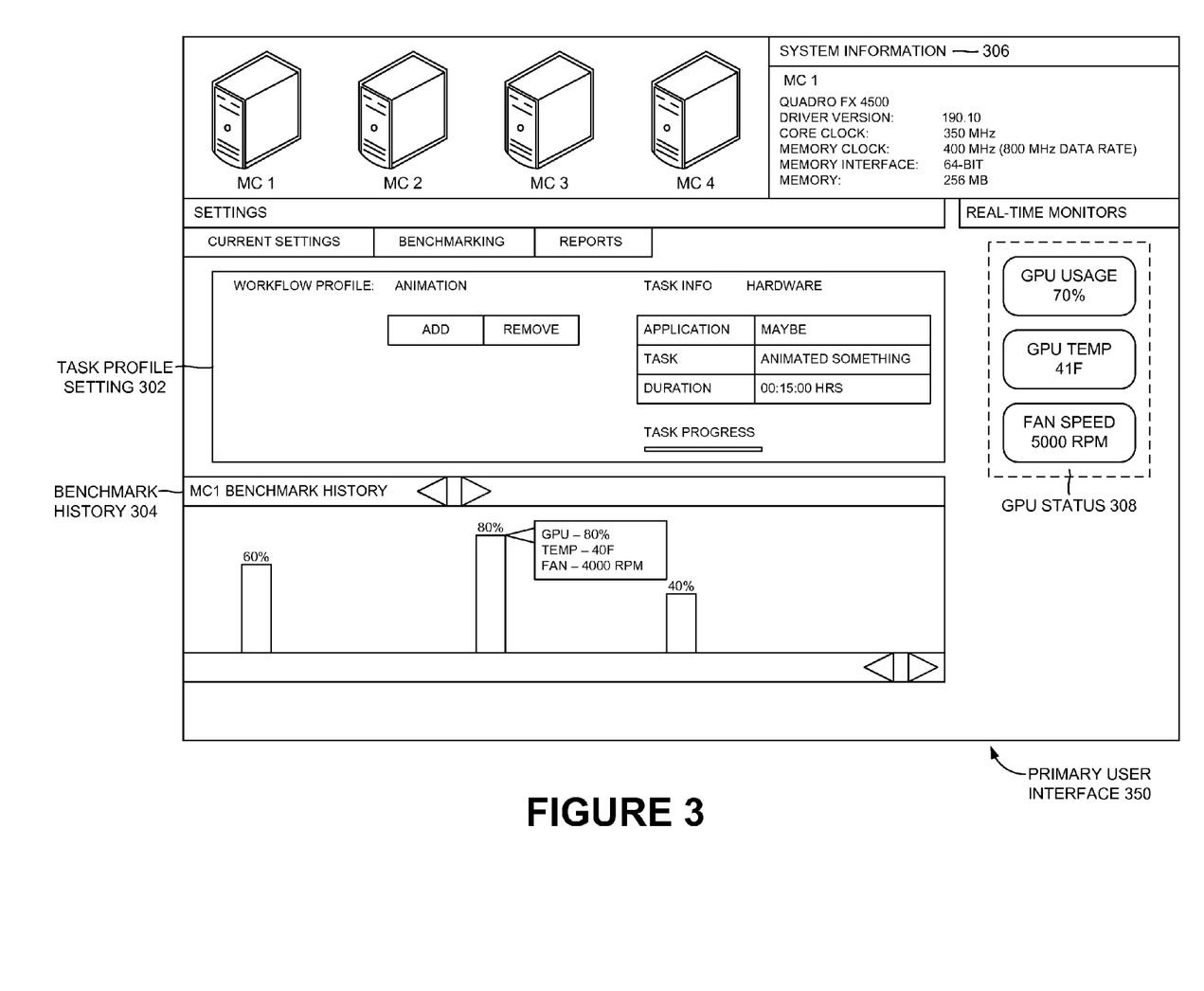
FIG. 3 is a schematic view of a primary user interface, according to one or more embodiments.

FIG. 3 is a schematic view of a primary user interface 350, in accordance with one or more embodiments. In one or more embodiments, the primary user interface 350 may render one or more task profile settings 302 of one or more task based profiles along with utilization of the GPU of one or more secondary devices (e.g., MC1, MC2, MC3, and MC4). The task profile settings 302 may include, for example, workflow profile (e.g., animation), type of stress test (e.g., run time test), task information including, for example, task (e.g., animation), and duration (e.g., 00:15:00 hrs) as illustrated in FIG. 3. The task profile settings 302 may also indicate task progress of a particular task. In one or more embodiments, the primary user interface 350 may also render GPU benchmarks (e.g., GPU 80%, Temp 40 F, Fan 4000 RPM), and/or benchmark history 304 for each of the secondary devices (e.g., MC1 Benchmark History). In one or more embodiments, the primary user interface 350 may further render system information 306 associated with the secondary devices. In one or more embodiments, the primary user interface 350 may further render a GPU status 308 (e.g., GPU usage 70%, GPU Temp 41 F, Fan speed 5000 RPM).

Figure 4A:
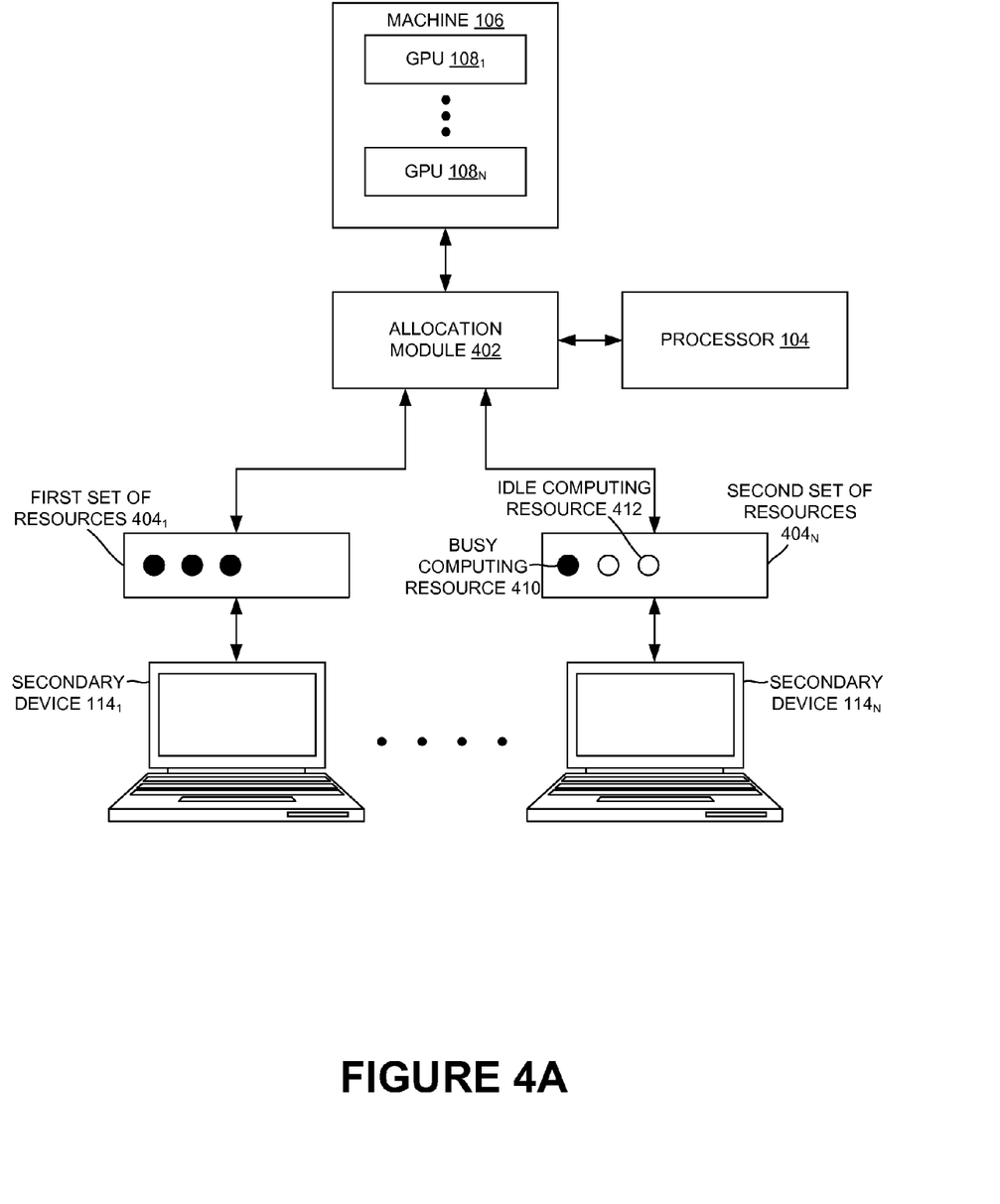
FIGS. 4A-4C is a schematic view of an example scenario of re-utilization of GPU horsepower over a local area network through allocation of one or more computing resources, according to one or more embodiments.
Figure 4B:
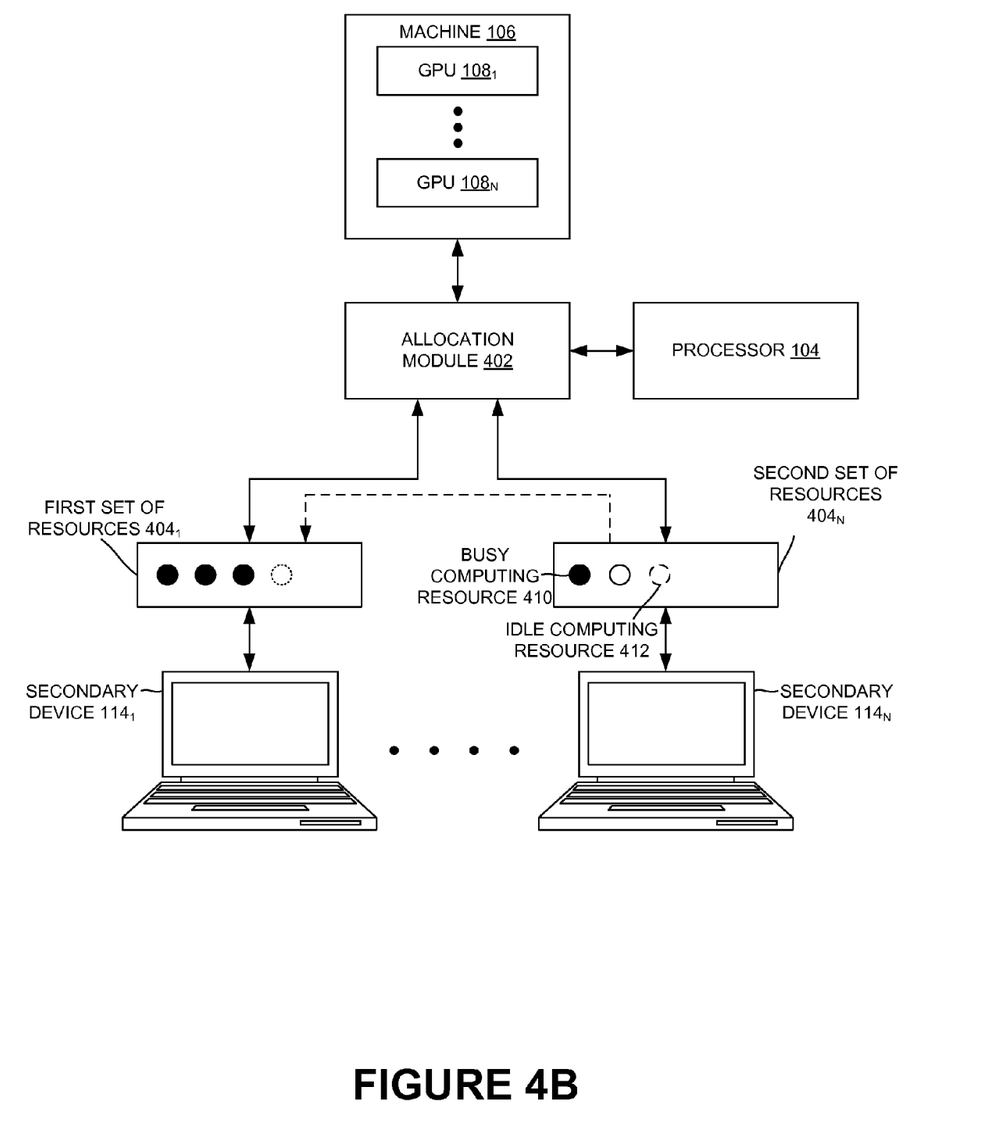
Figure 4C:
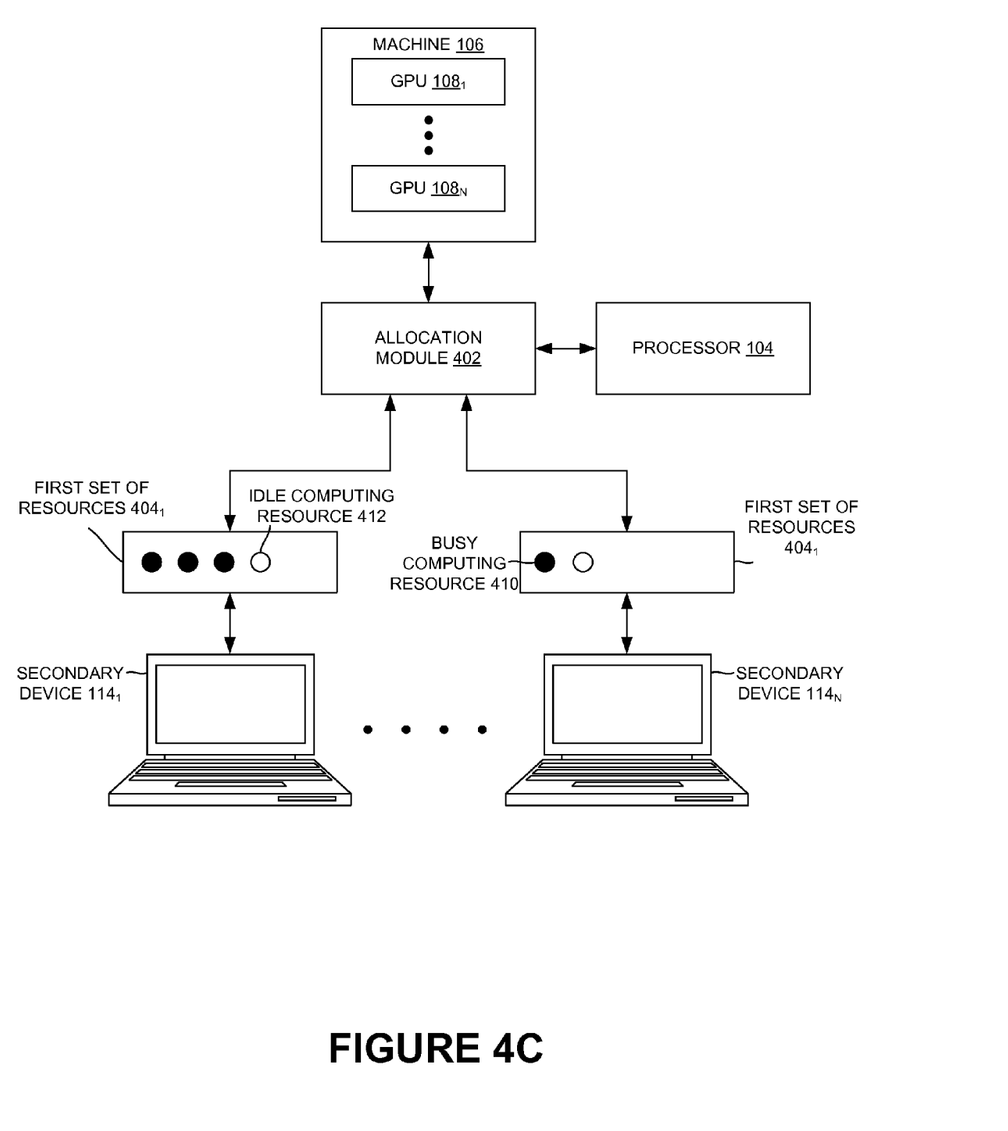

FIGS. 4A-4C is a schematic view of an example scenario of reutilization of GPU horsepower over a local area network through allocation of one or more computing resources, in accordance with one or more embodiments. In one or more embodiments, the machine 106 may monitor utilization of multiple GPUs (e.g., GPU $108_1$, GPU $108_N$) by one or more secondary devices (e.g., secondary device $114_1$, secondary device $114_N$). The utilization of the GPUs may be monitored through a primary user interface coupled to the machine 106 in real time. The machine 106 may be enabled with an allocation module 402 to allocate the GPU to one or more secondary devices based on the monitored utilization of the GPU. Each of the secondary devices, for example, the secondary device $114_1$ and the secondary device $114_N$ may utilize one or more computing resources (e.g., GPU) to perform a task.

The computing resources (e.g., first set of resources $404_1$ of secondary device $114_1$, second set of resources $404_N$ of secondary device $114_N$) may be either busy (e.g., busy computing resource 410) or idle (e.g., idle computing resources 412). Based on monitoring the utilization of the secondary devices ($114_1$-$114_N$), the primary device 120 may be enabled, through the allocation module 402, to determine the busy computing resource 410 or the idle computing resource 412 from among the first set of resources $404_1$ of secondary device $114_1$, second set of resources $404_N$ of secondary device $114_N$. If the utilization of the GPU indicates that the secondary device $114_1$ requires additional resources to perform a task, and that the secondary device $114_N$ has idle computing resource 412, then the machine 106 may allocate the idle resource 412 to the secondary device 114$_1$, through the allocation module 402 in coordination with the processor 104 as illustrated in FIGS. 4B-4C. The allocation may be dynamic and/or in real time. The allocation may optimize the utilization of the GPU by the secondary devices.

Figure 5:
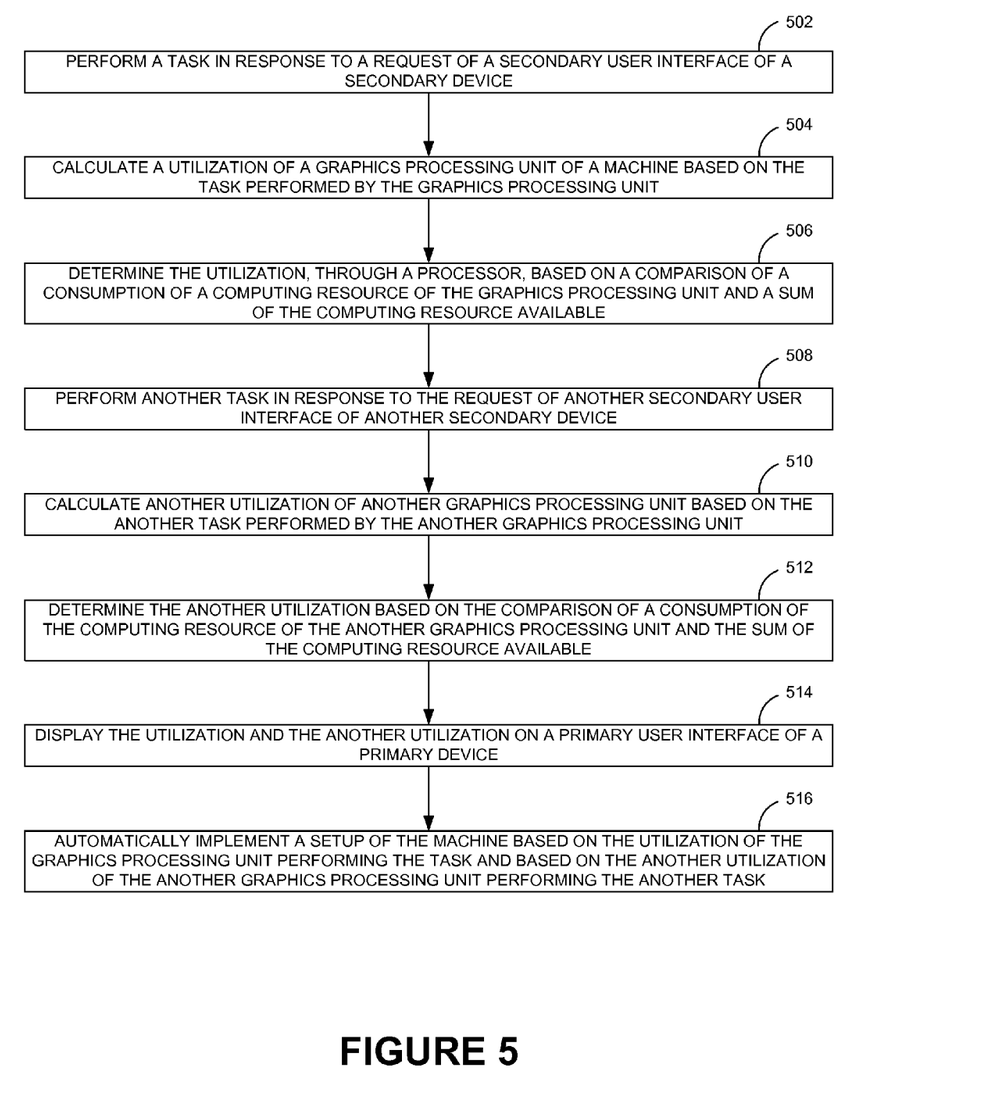
FIG. 5 shows a process flow diagram detailing the operations involved in utilization of a GPU based on one or more tasks, according to one or more embodiments.

FIG. 5 shows a process flow diagram detailing the operations involved in utilization of graphics processing unit based on one or more tasks, according to one or more embodiments. In one or more embodiments, operation 502 may involve performing a task in response to a request of a secondary user interface of a secondary device. The task may include, but is not limited to a process involved in the workflow of a project in for example, a visual effect studio. The task may be for example, one of a modeling, a rigging, a background developing, a coloring, a special effect creating, an animating, a lighting, a texturing, a rendering, and the like. In one or more embodiments, operation 504 may involve calculating a utilization of the graphics processing unit of a machine based on the task performed by the graphics processing unit. In one or more embodiments, operation 506 may involve determining the utilization, through a processor, based on a comparison of a consumption of a computing resource of the graphics processing unit and a sum of the computing resources available.

In one or more embodiments, operation 508 may involve performing another task in response to the request of another secondary user interface of another secondary device. In one or more embodiments, operation 510 may involve calculating another utilization of another graphics processing unit based on another task performed by another graphics processing unit. In one or more embodiments, operation 512 may involve determining another utilization based on the comparison of a consumption of the computing resource of another graphics processing unit and the sum of the computing resource available. In one or more embodiments, operation 514 may involve displaying the utilization and another utilization on a primary user interface of a primary device.

A user of the primary device may be different than the user of the secondary device. In one or more embodiments, operation 516 may involve automatically implementing a setup of the machine based on the utilization of the graphics processing unit performing the task and based on another utilization of another graphics processing unit performing another task. In one or more embodiments, a set of a computer programs may be run through the graphics processing unit to benchmark the graphics processing unit. A performance of the graphics processing unit may be assessed to perform the task based on a result of the running of the set of the computer programs. The performance of the graphics processing unit may be tested to run one of a software application and a hardware application based on the task. In one or more embodiments, the graphics processing unit may be benchmarked based on the performance of the graphics processing unit to run a stress test. The setup of the machine may be implemented based on the performance of the graphics processing unit through the primary user interface of the primary device.

The machine may perform the task based on a response to the secondary user interface of the secondary device. The setup may be a configuration of the machine to operate. The utilization of the graphics processing unit may be monitored in real-time as the graphics processing unit performs the task. In one or more embodiments, a profile based on the task assigned to the machine may be applied, through a response to the primary user interface of the primary device. The machine may perform the task based on a response to the secondary user interface of the secondary device. The profile hereinafter referred to as the task based profile may increase the performance of the graphics processing unit to execute the task.

A task based profile and another task based profile may be applied simultaneously, through a response to the primary user interface of the primary device. The task based profile and another task based profile may be different. In one or more embodiments, the utilization of the graphics processing unit may be identified. The graphics processing unit may be utilized as a display card. It may be identified that a majority of a processing power of the graphics processing unit is idle. A remainder of the processing power of the graphics processing unit may be reallocated to perform another task. The graphics processing unit may be performing the task and/or another task. In one or more embodiments, a compute unified device architecture application may be executed through a network including the graphics processing unit and another graphics processing unit, to reallocate the processing power of the graphics processing unit to assist another graphics processing unit to perform another task.

The compute unified device architecture may be a parallel computing architecture. In one or more embodiments, the graphics processing unit being underutilized may be identified. The graphics processing unit may be underutilized when the graphics processing unit consumes less than the sum of the computing resource available to the graphics processing unit. In one or more embodiments, the computing resource that is idle may be allocated to a pool. The computing resource may be idle when the computing resource is waiting to perform the task. The computing resource of the pool may be accessed, through a metadata. The pool may be accessible to a node associated with a local area network connected to the pool. In one or more embodiments, the utilization of the graphics processing unit of the machine may be monitored as the graphics processing unit performs the task. An availability of the computing resource may be determined based on the utilization of the graphics processing unit. The computing resource may be reallocated based on the availability of the computing resource, through a local area network, to another secondary device. Another secondary device may assist a secondary device to perform a task with the additional computing resource to increase a processing power and to reduce a time to complete the task.

Figure 6:
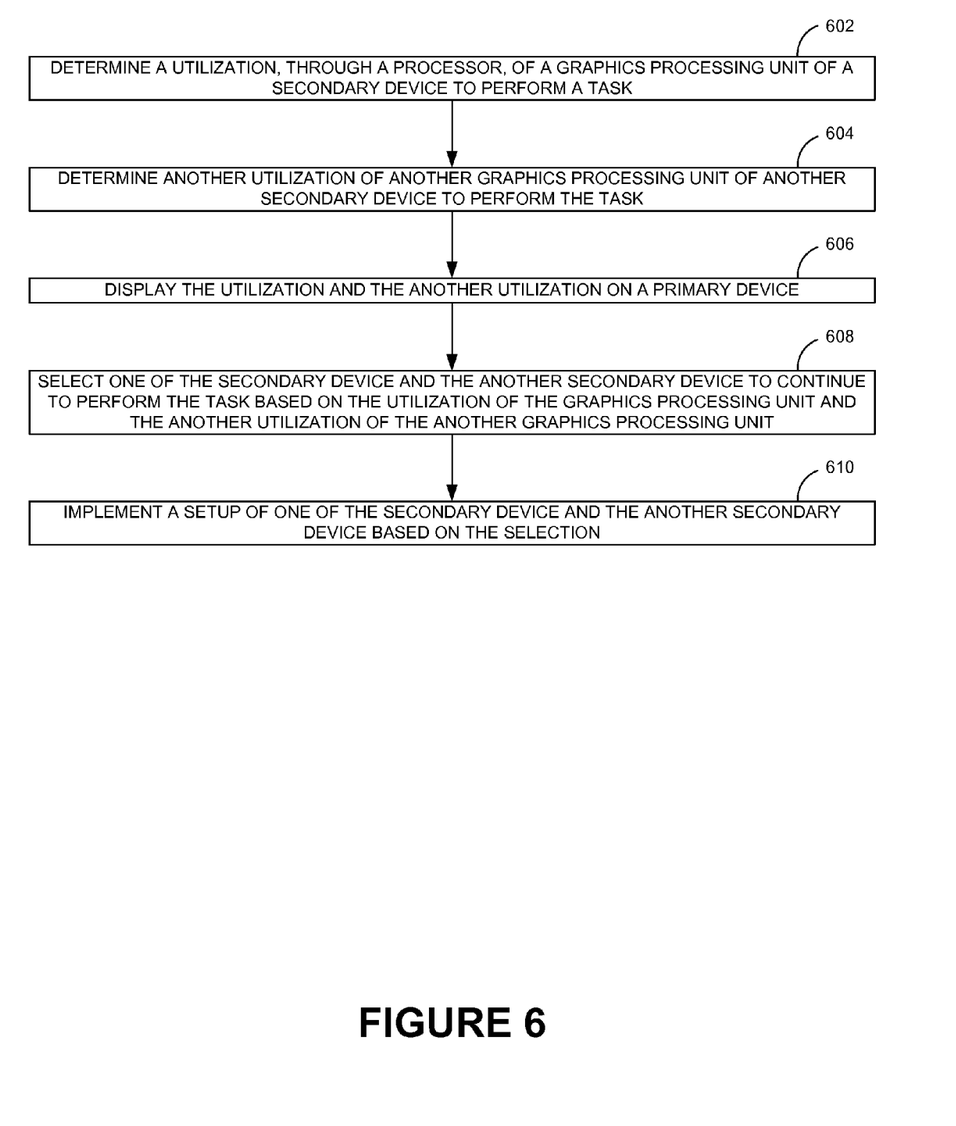
FIG. 6 shows a process flow diagram detailing the operations involved in a method of optimization of utilization of a GPU to perform a task, according to one or more embodiments.

FIG. 6 shows a process flow diagram detailing the operations involved in a method of optimization of utilization of a graphics processing unit (GPU) to perform a task, according to one or more embodiments.

In one or more embodiments, operation 602 may involve determining a utilization, through a processor, of a graphics processing unit of a secondary device to perform a task. The utilization of the graphics processing unit may be a percentage based on a computing power dedicated to perform the task and the computing power of the graphics processing unit. The task may be, for example animation. In one or more embodiments, operation 604 may involve determining another utilization of another graphics processing unit of another secondary device to perform the task. The utilization of the graphics processing unit may be the percentage based on the computing power dedicated to perform the task and the computing power of another graphics processing unit.

In one or more embodiments, operation 606 may involve displaying the utilization and another utilization on a primary device. The primary device may be different than the secondary device and another secondary device. In one or more embodiments, operation 608 may involve selecting one of the secondary device and another secondary device to continue to perform the task based on the utilization of the graphics processing unit and another utilization of another graphics processing unit. In one or more embodiments, operation 610 may involve implementing a setup of one of the secondary device and another secondary device based on the selection. In one or more embodiments, the graphics processing unit may be benchmarked based on a performance of the graphics processing unit to run a stress test. The setup of a machine may be implemented based on the performance of the graphics processing unit through a primary user interface of the primary device, the machine may perform the task based on a response to a secondary user interface of the secondary device. The setup may be a configuration of the machine to operate.

The utilization of the graphics processing unit may be monitored in real-time as the graphics processing unit performs the task. In one or more embodiments, a profile based on the task assigned to the machine may be applied based on a response to the primary user interface of the primary device. The machine may perform the task based on a response to the secondary user interface of the secondary device. The profile may increase the performance of the graphics processing unit to execute the task. In one or more embodiments, another task based profile based on another task may be simultaneously applied to another machine, through a response to the primary user interface of the primary device. The task based profile and another task based profile may be different. In one or more embodiments, the utilization of the graphics processing unit may be identified.

The utilization of the graphics processing unit may be similar to the utilization of a display card. A majority of a processing power of the graphics processing unit may be idle. A remainder of the processing power of the graphics processing unit may be reallocated to perform another task. The graphics processing unit may be performing the task and another task. A compute unified device architecture application may be executed, through a network including the graphics processing unit and another graphics processing unit, to reallocate the processing power of the graphics processing unit to assist another graphics processing unit to perform another task. The compute unified device architecture may be a parallel computing architecture.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable to perform functions through operations on input and generation of output. These input and output operations may be performed by a processor. The machine-readable medium may be, for example, a memory, a transportable medium such as a CD, a DVD, a Blu-ray™ disc, a floppy disk, or a diskette. The medium may include instructions embodied therein. A computer program embodying the aspects of the exemplary embodiments may be loaded to the system. The computer program is not limited to specific embodiments discussed above, and may, for example, be implemented in an operating system, an application program, a foreground or background process, a driver, a network stack or any combination thereof. The computer program may be executed on a single computer processor or multiple computer processors. Accordingly, the specification and drawings are to be regarded in an illustrative rather than a restrictive sense.

What is claimed is:

1. A method comprising:

performing a task in response to a request of a secondary user interface of a secondary device, the task being one of a modeling, a rigging, a background developing, a coloring, a special effect creating, an animating, a lighting, a texturing, and a rendering;

calculating a utilization of a graphics processing unit of a machine based on the task performed by the graphics processing unit;

determining the utilization, through a processor, based on a comparison of a consumption of a computing resource of the graphics processing unit and a sum of the computing resource available;

running a set of computer programs through the graphics processing unit to benchmark the graphics processing unit, the benchmarking being done to run a stress test;

assessing a performance of the graphics processing unit to perform the task based on a result of the running of the set of the computer program;

testing the performance of the graphics processing unit to run one of a software application and a hardware application based on the task;

performing another task in response to the request of another secondary user interface of another secondary device;

implementing the setup of the machine based on the performance of the graphics processing unit through the primary user interface of the primary device, wherein the machine performs the task based on a response to the secondary user interface of the secondary device, and wherein the setup is a configuration of the machine to operate;

monitoring the utilization of the graphics processing unit in real-time as the graphics processing unit performs the task;

calculating another utilization of another graphics processing unit based on the another task performed by the another graphics processing unit;

determining the another utilization based on the comparison of a consumption of the computing resource of the another graphics processing unit and the sum of the computing resource available;

displaying the utilization and the another utilization on a primary user interface of a primary device, wherein a user of the primary device is different than the user of the secondary device;

automatically implementing a setup of the machine based on the utilization of the graphics processing unit performing the task and based on the another utilization of the another graphics processing unit performing the another task;

applying a profile based on the task assigned to the machine, through a response to the primary user interface of the primary device, wherein the machine performs the task based on a response to the secondary user interface of the secondary device, and wherein the profile increases the performance of the graphics processing unit to execute the task; and applying, simultaneously, another profile based on the another task to another machine, through a response to the primary user interface of the primary device, wherein the another profile and the profile are different.

2. The method of claim 1, wherein the secondary device is a computing device.

3. The method of claim 1, further comprising:
identifying the utilization of the graphics processing unit, wherein the utilization of the graphics processing unit is similar to the utilization of a display card, and wherein a majority of a processing power of the graphics processing unit is idle; and
reallocating a remainder of the processing power of the graphics processing unit to perform the another task, wherein the graphics processing unit is performing the task and the another task.

4. The method of claim 3, further comprising:
executing a compute unified device architecture application, through a network comprising the graphics processing unit and the another graphics processing unit, to reallocate the processing power of the graphics processing unit to assist the another graphics processing unit to perform the another task, wherein the compute unified device architecture is a parallel computing architecture.

5. The method of claim 1, further comprising:
identifying the graphics processing unit that is underutilized, wherein the graphics processing unit is underutilized when the graphics processing unit consumes less than the sum of the computing resource available to the graphics processing unit;
allocating the computing resource that is idle to a pool, wherein the computing resource is idle when the computing resource is waiting to perform the task; and
accessing the computing resource of the pool, through a metadata, wherein the pool is accessible to a node associated with a local area network connect to the pool.

6. The method of claim 1, further comprising:
monitoring the utilization of the graphics processing unit of the machine as the graphics processing unit performs the task;
determining an availability of the computing resource based on the utilization of the graphics processing unit;
reallocating the computing resource based on the availability of the computing resource, through a local area network, to the another machine; and
assisting the another machine to perform the another task with the availability of the computing resource to increase a processing power and to reduce a time to complete the another task.

7. A method comprising:
determining a utilization, through a processor, of a graphics processing unit of a secondary device to perform a task, wherein the utilization of the graphics processing unit is a percentage based on a computing power dedicated to perform the task and the computing power of the graphics processing unit, wherein the task is animation;
benchmarking the graphics processing unit based on a performance of the graphics processing unit to run a stress test;
implementing the setup of a machine based on the performance of the graphics processing unit through a primary user interface of the primary device, wherein the machine performs the task based on a response to a secondary user interface of the secondary device, and wherein the setup is a configuration of the machine to operate;
monitoring the utilization of the graphics processing unit in real-time as the graphics processing unit performs the task;
determining another utilization of another graphics processing unit of another secondary device to perform the task, wherein the another utilization of the graphics processing unit is the percentage based on the computing power dedicated to perform the task and the computing power of the another graphics processing unit;
displaying the utilization and the another utilization on a primary device, wherein the primary device is different than the secondary device and the another secondary device;
selecting one of the secondary device and the another secondary device to continue to perform the task based on the utilization of the graphics processing unit and the another utilization of the another graphics processing unit;
implementing a setup of one of the secondary device and the another secondary device based on the selection;
applying a profile based on the task assigned to the machine, through a response to the primary user interface of the primary device, wherein the machine performs the task based on a response to the secondary user interface of the secondary device, and wherein the profile increases the performance of the graphics processing unit to execute the task; and
applying, simultaneously, another profile based on another task to another machine, through a response to the primary user interface of the primary device, wherein the another profile and the profile are different.

8. The method of claim 7, further comprising:
identifying the utilization of the graphics processing unit, wherein the utilization of the graphics processing unit is similar to the utilization of a display card, and wherein a majority of a processing power of the graphics processing unit is idle; and
reallocating a remainder of the processing power of the graphics processing unit to perform the another task, wherein the graphics processing unit is performing the task and the another task.

9. The method of claim 8, further comprising:
executing a compute unified device architecture application, through a network comprising the graphics processing unit and the another graphics processing unit, to reallocate the processing power of the graphics processing unit to assist the another graphics processing unit to perform the another task, wherein the compute unified device architecture is a parallel computing architecture.

10. A system comprising:
a processor to determine a utilization of a graphics processing unit of a secondary device to perform a task, wherein the utilization of the graphics processing unit is a percentage based on a computing power dedicated to perform the task and the computing power of the graphics processing unit, the task of the graphics processing unit being one of a modeling, a rigging, a background developing, a coloring, a special effect creating, an animating, a lighting, a texturing, and a rendering;
the graphics processing unit to perform the task in response to a request of the secondary device;
the secondary device to request a performance of the task in response to a secondary user interface;

a primary device to display the utilization of the graphics processing unit based on the performance of the graphics processing unit to execute the task;
a primary user interface to request an application of a profile based on the task assigned to a machine, wherein the profile increases the performance of the graphics processing unit to execute the task; and
a compute unified device architecture application to reallocate a processing power of the graphics processing unit, through a network comprising the graphics processing unit and another graphics processing unit, to assist the another graphics processing unit to perform another task, wherein the compute unified device architecture is a parallel computing architecture,
wherein the graphics processing unit is benchmarked through a stress test based on the performance of the graphics processing unit in running the stress test.

* * * * *